Figure 1:
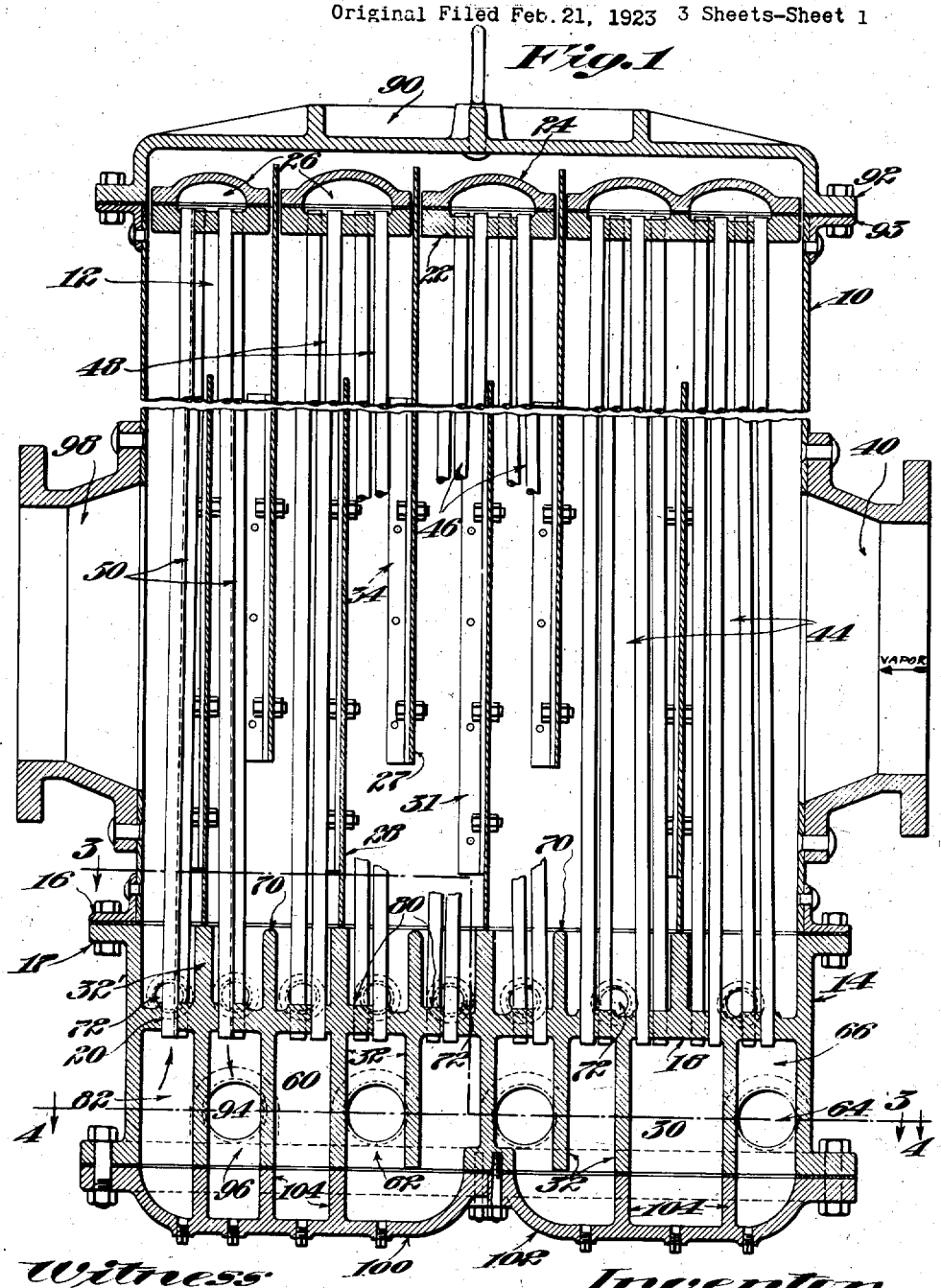

Feb. 14, 1928.

C. H. LEACH

REFINING APPARATUS

Re. 16,878

Original Filed Feb. 21, 1923 3 Sheets-Sheet 1

Witness
M. E. Crozier

Inventor
Charles H. Leach
by his Attorneys
Van Everen Fish & Hildebrandt & Carey Feb. 14, 1928. C. H. LEACH Re. 16,878

REFINING APPARATUS

Original Filed Feb. 21, 1923 3 Sheets-Sheet 2

Witness
M. B. Crozier

Inventor
Charles H. Leach
by his Attorneys
Van Everen Fish Hildreth & Perry

Feb. 14, 1928. C. H. LEACH Re. 16,878

REFINING APPARATUS

Original Filed Feb. 21, 1923 3 Sheets-Sheet 3

Witness

M. L. Orgin

Inventor

Charles H. Leach by his attorneys

Van Santvoord Fish Hibben & Parry.

Reissued Feb. 14, 1928. Re. 16,878

UNITED STATES PATENT OFFICE.

CHARLES H. LEACH, OF NEWTON HIGHLANDS, MASSACHUSETTS.

REFINING APPARATUS.

Original No. 1,604,179, dated October 26, 1926, Serial No. 620,522, filed February 21, 1923. Application for reissue filed December 30, 1926. Serial No. 158,119.

The present invention relates to oil refining apparatus and more particularly to condensing apparatus employed in conjunction with apparatus for distilling crude or partially refined oil.

One object of the present invention is to provide a new and improved form of condensing and cooling apparatus which insures an accurate control of temperature during the passage of the oil vapor through the apparatus, permitting the condensed vapor to be fractionated and products having different boiling points to be separated and withdrawn from the apparatus.

A further object of the invention is to provide a condensing and cooling apparatus which utilizes the heat extracted from the oil vapor in the condensing operation in a useful manner, preferably for elevating the temperature of the charge oil which is subsequently passed through the refining stills.

A still further object of the invention is to reorganize and improve heat exchange apparatus of this general character with the intent of particularly adapting such apparatus to oil refining operations.

With these and other objects in view, a feature of the present invention contemplates the provision of selectively controlled channels or passes by means of which the paths of the cooling medium may be varied as desired, the construction also permitting the employment of two or more cooling mediums of a different character if necessary.

A further feature of the present invention contemplates the provision of a plurality of demountable and interchangeable units of different capacities enclosed within a receiving shell of such a design that a variety of combinations of units of different capacities may be mounted within the same shell, permitting the apparatus to be modified in a manner to successfully handle the condensation of oil vapor under different working conditions.

A further feature of the invention consists in a construction by virtue of which condensate pockets or basins are formed for the collection of liquid and are made readily accessible without disconnecting the various liquid connections, and in addition the interior of the cooling tubes is rendered accessible for cleaning purposes without dismantling the apparatus.

Still further features of the invention consist in certain novel features of construction, combinations and arrangements of parts hereinafter described and claimed, the advantages of which will be obvious to those skilled in the art from the following description.

Figure 2:
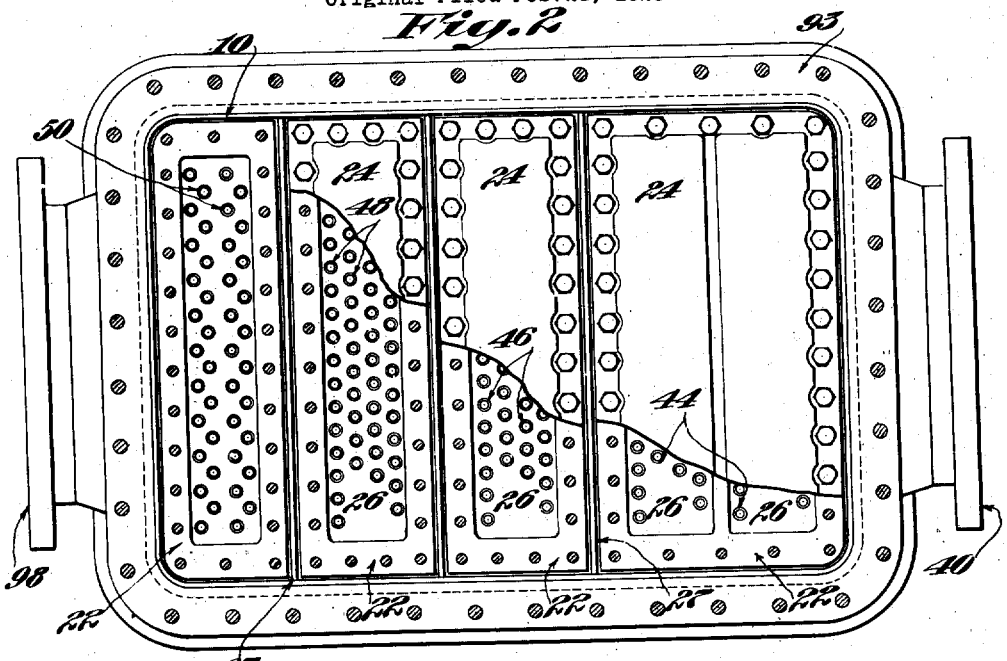
Figure 3:
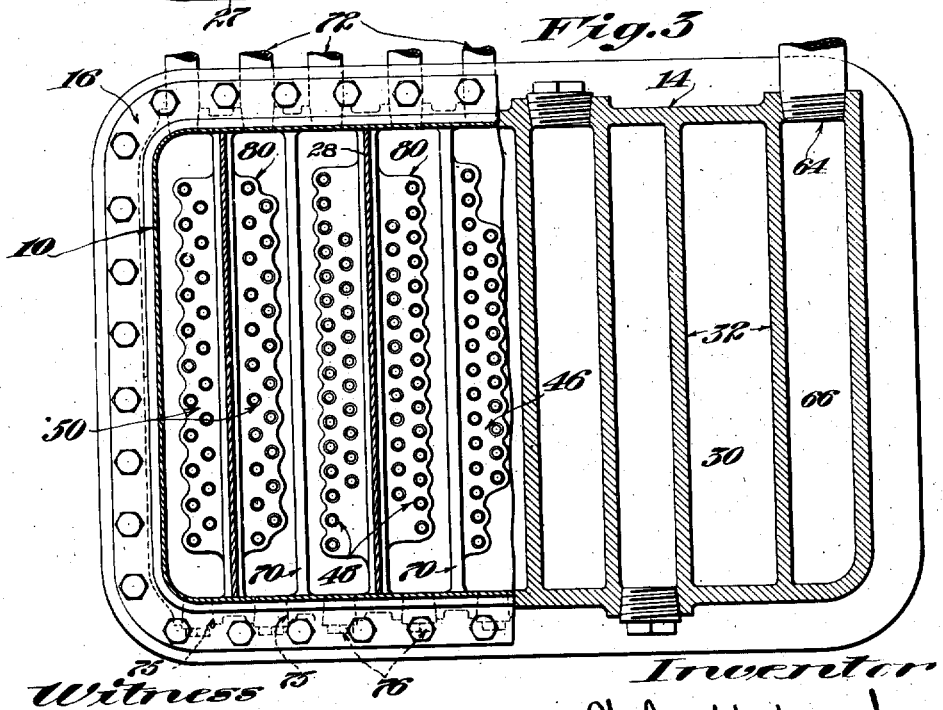
Figure 4:
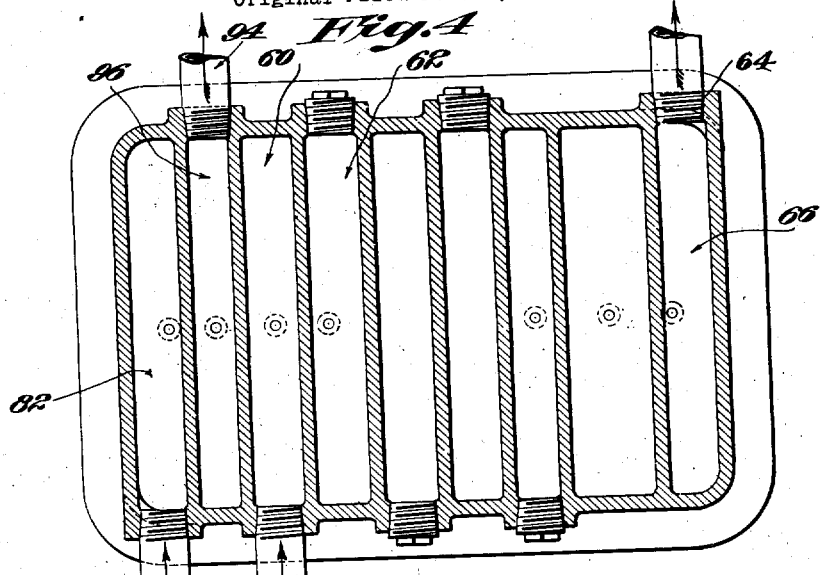
Figure 5:
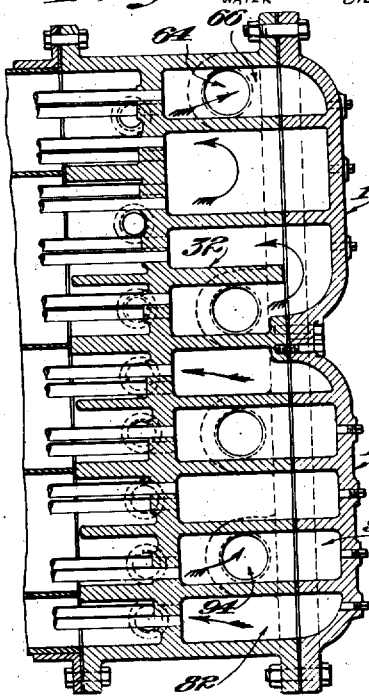
Figure 6:
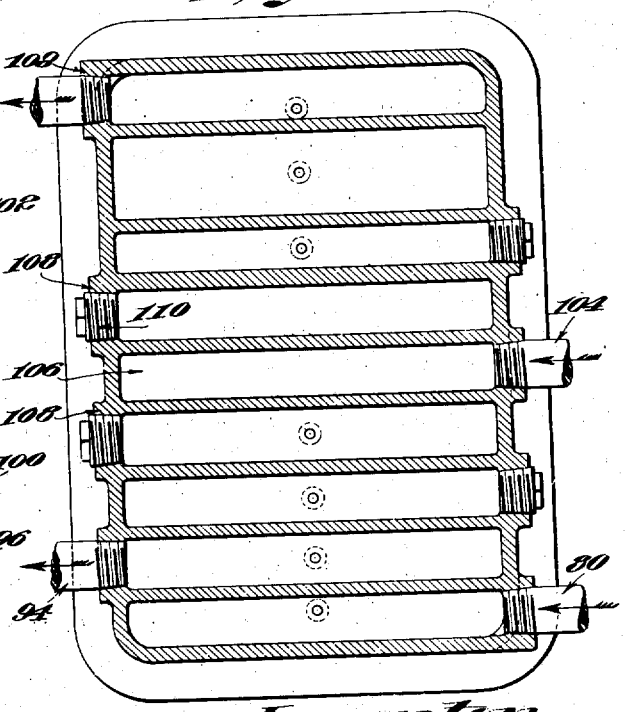

In the accompanying drawings illustrating the preferred form of the invention, Fig. 1 represents a section in elevation of a condenser embodying the novel features of the invention; Fig. 2 is a top plan view of the apparatus with the cover plate removed; Fig. 3 is a section upon the line 3—3 of Fig. 1 and showing the supporting means for the lower ends of the tubes, together with the discharge outlets for the condensed vapor; Fig. 4 is a detail upon the line 4—4 of Fig. 1; and Figs. 5 and 6 represent a longitudinal section and transverse section respectively, showing a modified form of construction for varying the path of flow of the cooling effect.

The illustrated embodiment of the invention is preferably employed in a system comprising four continuously operating stills with a condensing and cooling apparatus for each still. The charge oil employed for cooling and condensing the vapor from the still may be pumped through the four separate condensers in series before delivery to the first still in the battery. In the first still, a portion of the charge oil is evaporated and the oil thereafter is delivered to succeeding stills, which operate at a progressively higher temperature. The vapor resulting from the partial evaporation of this oil is delivered from each still to a condensing and cooling unit, and is thereafter guided through a series of vapor passes, encountering cooling tubes during its passage therethrough. Owing to the character of the vapor passes and the design and arrangement of the cooling tubes, the vapor temperature is progressively lowered and at different points in the vapor passes condensate of different boiling points is collected. The cooling and condensation of the vapor is accomplished by a series of banks of cooling tubes through which charge oil is caused to pass progressively, starting at the condenser receiving the coldest vapor and finally passing through the condenser receiving the hottest vapor, the oil being delivered therefrom to the first still in the series. In certain cases it may be desirable, in order to accomplish the final condensation and cooling of steam, fixed gases and air, to substitute for the charge oil a cooling medium, such as water or air, this cooling medium passing through the banks of tubes in the coldest section of the condenser. The charge oil not only provides an efficient cooling medium but in addition conserves the heat abstracted from the vapor which, under normal conditions of operation, is wasted. In ordinary practice where the condensers are employed in conjunction with continuously operating stills, the oil vapor may enter the condenser at 300° F. from the coldest still and 650° F. from the hottest still. In each case the oil vapor is completely condensed, leaving only air and a certain proportion of fixed gases to be discharged at a temperature of less than 70° F. On the other hand, the charge oil may enter the coldest condenser at 90° F. and after passing through this condenser, together with the succeeding condensers, may be discharged into the first still within a few degrees of the vaporizing temperature. In order that the temperature of the fixed gases and air may be reduced to a minimum and also that varying quantities of steam may be successfully condensed, a relatively small quantity of cold water may be employed as a cooling medium in the last stages of condensation. As this cooling medium is employed for the condensation of steam, it is possible to heat the water to a point at which it may be successfully used about the refining plant, and in so doing the heat may be conserved at a considerable saving. In this connection it will be evident to those skilled in the art that different refining processes and different grades of oil require different quantities of steam for agitation of the oils in the stills, and this steam is eventually delivered to the condenser with the oil vapor. In order, therefore, that the condenser may successfully handle the condensation of varying quantities of steam, it is highly desirable that an adjustment of the water and charge oil passages be provided for, in order that the water may be made to pass through a larger proportion of the cooling tubes in the condenser and the charge oil a correspondingly smaller portion of the tubes, if so desired. A further advantage of employing charge oil for the cooling medium is due to the presence of quantities of water in the charge oil. In ordinary processes of refining, this water upon entering the stills is suddenly converted into steam, creating a pressure so great that the relief valve with which the still is provided is opened, permitting the steam, together with a certain amount of oil vapor, to be discharged. The discharge of this oil vapor, which is a matter of comparatively frequent occurrence, is naturally objectionable and creates a distinct fire hazard. In the present apparatus the gradual heating of the oil during its passage through the cooling tubes permits the occluded water to be heated and evaporated into steam without injurious effect, the charge oil containing this steam being subsequently delivered to the stills without creating sudden pressure and with no cessation in the operation of the still.

The improved apparatus shown in the drawings comprises generally an enclosing shell, indicated at 10, of substantially rectangular form. This shell is open at opposite ends and encloses a series of banks of cooling tubes, indicated generally at 12. The lower end of the shell is closed by a supporting base member 14 of rectangular shape, which is securely connected to the shell through flanged connections indicated at 16 and 17. The base member is provided with a transverse web 18 which forms a single unitary support for the several banks of tubes in the condenser. As indicated, the web is provided with a series of openings 20 within which the lower ends of the tubes are received and secured in the usual manner. Each bank of tubes at its upper end is connected into a separate head, indicated at 22, the head being closed by a detachable cover 24 which seals a passage 26 communicating with the open upper ends of each bank of tubes. The head connected to the upper end of each bank of tubes is separate and independent of each of the other heads, and has no mechanical connection with the other heads or the enclosing shell, the heads being supported entirely by the tubes themselves. The lower ends of the tubes extend through the web 18 and communicate with a series of chambers or channels 30 formed in the base member through the provision of integral partition walls 32. The passage of the vapor around the several banks of tubes is controlled by upper and lower baffle plates, indicated respectively at 27 and 28. These baffle plates extend across the shell 10 between the tubes, and the lower baffles 28 are securely connected to the walls of the shell through angle connections 31 to which the baffles are bolted. As will be evident from an inspection of Fig. 1, the baffle plates 28 extend upwardly within the shell 10 from partition walls 32′ formed upon the web 18 of the base member 14, these baffle plates aiding in the formation of separate compartments or chambers within which the condensate is collected. The upper baffles 27 are connected at opposite sides to the shell through similar angles 34, and extend from between adjacent floating heads downwardly part way through the shell in a manner to control the flow of oil vapor and to leave open a continuous but tortuous passage therefor. In this construction the oil vapor to be condensed enters through a nozzle 40 connected to the side of the shell 10, and is thereafter directed through the various vapor passes, encountering the cooling tubes 12 during its travel therethrough. The hot vapor which may vary in temperature from 300°–650° F., depending upon the still from which it is discharged, first encounters the double bank of tubes shown particularly at 44. After completing its traverse over the surfaces of the double bank of tubes, the vapor at a lower temperature encounters two separate banks of tubes 46 and 48, and finally passes over the last bank of tubes, indicated at 50, the temperature of the vapor at the point of discharge being lowered to below 70° F. It will be evident to those skilled in the art that the expansion and contraction of the different banks of tubes, owing to the widely varying temperatures of these tubes during the operation of the condenser must necessarily vary. Inasmuch as it is desirable as a matter of design to make the tubes in each bank comparatively long, it will be further evident that the total difference in expansion of each bank of tubes, due to variation of temperatures, will assume considerable proportions. By virtue of the present construction, in which the lower ends of the several banks of tubes are connected to a single unitary base, whereas the upper ends of the tubes in each bank are connected to separate and independent heads, the unequal contraction and expansion of each bank of tubes is readily accomplished through the movements of the head. Furthermore, if the different tubes in each single bank tend to vary in length, due to different temperatures, a slight tilting movement of the floating head is permitted without imposing undue strains upon the apparatus.

The charge oil or other cooling medium conveniently enters the condenser through an opening 55 communicating with the chamber 60, as shown in Fig. 4. From this chamber the oil passes upwardly through a portion of the tubes in the bank 48 and is discharged from the upper end into the closed chamber or passage 26. From this point the oil is directed downwardly through the remainder of the tubes and the bank 48 into the next adjacent compartment 62. Thereafter the cycle is repeated in the bank of tubes 46 and in the double bank of tubes 44, the charge oil being finally discharged through a delivery nozzle 64 communicating with the chamber 66, after having been heated to a considerably higher temperature. During the passage of the oil vapor through the condenser, the condensate is deposited upon the walls of the tubes and the surfaces of the baffles. This condensate, after it is deposited, runs down the walls of the tubes and baffles and is collected in a series of compartments formed by the partitions 32′ in conjunction with intermediate partition walls 70, as indicated clearly in Fig. 1. This condensate, having different boiling points and different specific gravities, may be withdrawn from the several collecting compartments through delivery nozzles or openings 72. The base member 14, in which the channels are formed, together with the supporting web for the lower ends of the tubes, is preferably made of cast iron which is only slightly affected, if at all, by the corrosive action of the condensed vapor. On the other hand, the tubes themselves must be protected so far as possible from the corrosive action of this condensate, and to this end the lower ends of the tubes are surrounded by a series of elevated pads 80 which project integrally from the web 18 and serve to maintain stagnant condensate in the basins from direct engagement with the lower ends of the tubes. It will be evident that the level of the delivery openings 72 is so located with respect to these elevated pads that the liquid level of the condensate ordinarily is below the upper surface of the pads and there is no direct contact of the condensate with the walls of the tubes except as the drops of condensate are deposited thereon and run down the tubes. The oils employed in usual refining operations contain quantities of chemicals which when heated to high temperatures become very active corrosive agents. The present construction minimizes and tends to avoid the injurious effects of such corrosive actions, owing to the relatively heavy cast iron basins in which the condensate is collected and the vertical position of the tubes which causes the condensate to be immediately drained therefrom. The presence of impurities in the condensate requires cleaning of the collecting basins and passages, and to simplify this operation openings 75 are located opposite the delivery opening 72 in such a manner that removal of the plugs 76 permits the basins or compartments to be easily flushed out by disconnecting the outlets 72. It will be evident that the cleaning of these basins is accomplished without disconnecting the tubes or the upper and lower heads.

The shell 10 is surmounted by a cover casting 90 which is secured thereto through flanged connections 92 and 93, and completely encloses the space within which the floating heads 22 move. It will be observed from an inspection of Fig. 1 that the cover plate, the outer shell and the base member are sealed along their meeting faces in order that the oil vapor may be completely confined therein. There is no opportunity for the cooling medium in the form of charge oil to contact directly with the oil vapor, as the chambers or channels formed in the base 14 and through which the oil flows are separated from the vapor passes by the integral web 18 and the passages communicating with the upper open ends of the cooling tubes are enclosed by sealing the cover plates 24 to the complementary portion of the floating head 22. The complete separation of the oil vapor and cooling medium is of considerable importance in apparatus of this type, especially if it is desired to employ water as the cooling medium, as the direct contact of the water and oil vapor immediately generates steam with a resulting explosion and damage to the apparatus.

In the present form of apparatus, it is considered preferable to cool the last bank of tubes by means of water which may enter the tubes through an opening 80 communicating with a channel 82 formed in the base member and be discharged therefrom through an opening 94 communicating with the next adjacent channel 96. This cooling feature is employed only after the temperature of the oil vapor has been reduced to a temperature which is approximately the entering temperature of the charge oil.

The oil vapor, after completing its traverse of the various vapor passes, is discharged outwardly from the condenser through a nozzle, indicated at 98, which may communicate with any suitable form of vacuum pump, the interior of the condenser being maintained at a partial vacuum. The cooling medium, such as the water and charge oil, is pumped through the cooling tubes in any desired manner. The channels formed in the base member 14 are closed by cover members 100 and 102, which are connected to the lower portion of the base member and are provided with ribs 104, which cooperate with the partitions 32 to close the channels. The closure of the channels in this manner through the employment of removable cover plates permits the operation of the condenser to be varied by the substitution of different cover plates having differently located ribs in order to cut out certain banks of tubes if so desired. It will be obvious that by substituting for the cover plates shown similar cover plates having differently located ribs, the flow of the cooling medium may be diverted and changed in accordance with varying conditions.

The employment of a condenser shell of substantially rectangular form, within which are enclosed a plurality of banks of tubes of similar rectangular form, permits the tube units to be varied within practical limits without varying the form of the outer shell; as, for example, the double bank of tubes initially enclosed by the oil vapor in the illustrated embodiment of the invention might be replaced by two single banks, or a series of double banks instead of single banks might be employed. This feature is of considerable practical importance in oil refining apparatus as it permits an adjustment of the width of the oil passes in order to insure a uniform rate of velocity of the oil vapor. Furthermore the construction of the condenser by virtue of which the lower ends of the tubes and the communicating channels formed in the base 14 are exposed upon removal of the cover plates 100 permits ready access to this portion of the condenser without disconnecting the pipes for admitting and discharging the cooling medium or for handling the condensate. It will be evident that in the illustrated embodiment of the invention, provision is made for removing condensate from eight different points in the condenser, the condensate removed from these points either being mixed to form a blend or kept separate, as desired.

The manner in which the circulation of cooling medium through the interior of the tubes may be varied is well illustrated in Figs. 5 and 6. It will be evident from an inspection of Figs. 1 and 4 that two separate cooling mediums are caused to circulate through the different banks of tubes, the charge oil being admitted to the passage 60 through the inlet 55 and thereafter circulating progressively through successive banks of tubes until it is discharged outwardly through the passage 66 and outlet 64. The last bank of tubes, as shown in these two figures, may be cooled by water delivered to the passage 82 through the inlet 80, and after circulating through the last bank of tubes being discharged through the passage 96 and the outlet 94. By providing different cover members, as indicated at 100 and 102 in Fig. 5, the path of circulation may be varied. In this construction a cooling medium, such as water, is first admitted to the passage 82 through the intake 80, and after passing through the last bank of tubes is discharged through the passage 96 and outlet 94. The second cooling medium, such as charge oil, is admitted through the intake 104 into a passage 106, and after circulating through successive banks of tubes is discharged through the passage 66 and outlet 64. It will be evident from an inspection of the drawings that the wall of the base member between the depending ribs 32 is provided with a series of openings 108 which may be connected with intake and delivery pipes or closed by plugs 110. The provision of these different openings, in conjunction with different cover plates, permits an effective control of the paths of circulation of cooling mediums.

It will be understood by those skilled in the art that one feature of the present invention contemplates means for selectively controlling the cooling effect of the condenser tubes in such a manner that the character of the resulting condensate may be controlled as desired. This control may be exercised by variation of the path of flow of a single cooling medium or through the employment of a plurality of cooling mediums with a variation of the path of flow of either or both of the mediums. It is to be understood, therefore, that claims directed to variations of the path of flow of a cooling medium to graduate the condensate are not confined to the employment of a single cooling medium.

It will be understood by those skilled in the art that certain features of the present invention are not limited in their application to oil refining apparatus or to condensing apparatus, and that the present invention is intended to cover certain of these features which are peculiarly adapted to embodiment in apparatus of the same general character even though not employed for the specific purposes outlined.

What is claimed is:

1. Refining apparatus comprising a series of tubes, means for directing a flow of vapor about the exterior of the tubes, successive and independent condensate basins surrounding the lower ends of groups of the tubes, and means for directing a cooling medium through the interior of the tubes designed to permit variation of the path of flow of the medium in order to vary the cooling effect and graduate the condensate collected in the basins.

2. Refining apparatus comprising a series of banks of vertical tubes, means for directing a flow of vapor about the exterior of the tubes, a series of independent basins surrounding the lower portions of the tubes and adapted to collect condensate, connections with each of the basins permitting the removal of condensate therefrom, and means for directing cooling mediums through the interior of the tubes designed to provide for variations in the paths of flow to vary the cooling effect and in consequence the character of condensate collected in the basins.

3. Apparatus for fractionating oil vapor comprising a series of condenser tubes, means for passing oil vapor through the space surrounding the exterior of the tubes, and means for directing cooling medium through the interior of the tubes having provision for varying the path of flow of the medium through successive tubes of the series in a manner to control the temperature of condensation and graduate the condensate.

4. Refining apparatus comprising a plurality of banks of condenser tubes, a base member in which the lower ends of the tubes are mounted, a series of condensate basins formed in the member about the tubes, a series of ribs projecting downwardly from the base member to provide a separate channel for each bank of tubes, and a detachable cover member having ribs cooperating with certain of the depending ribs to direct the flow of a cooling medium or mediums progressively through the different banks of tubes.

5. Refining apparatus comprising a plurality of vertical tubes, a base member having an integral transverse web in which the lower ends of the tubes are mounted, an outer wall formed upon the base member and extending substantially above and below the web, a shell enclosing the upper ends of the tubes and secured to the uper portion of the wall, a series of condensate basins formed in the upper portion of the web and surrounding the lower ends of the tubes, and liquid outlets extending from the separate condensate basins to permit withdrawal of condensate therefrom.

6. Refining apparatus comprising a plurality of vertical tubes, a lower head casting in which the lower ends of the tubes are mounted, a series of condensate basins formed in the head casting and surrounding the lower ends of the tubes, liquid outlets extending from the condensate basins and adapted to drain condensate therefrom, and a series of openings in the head casting formed opposite the liquid outlets and adapted to provide means for flushing out the condensate basins.

7. Refining apparatus comprising a series of vertical condenser tubes, a lower head casting having a transverse web in which the ends of the tubes are mounted, a series of elevated pads formed upon the web and surrounding the lower ends of the tubes and partition members to provide a series of condensate basins, delivery outlets connected with the lowermost portion of each condensate basin, means for directing vapor about the exterior of the tubes, and means for passing a cooling medium through the interior of the tubes.

8. Refining apparatus comprising a series of banks of vertical condenser tubes, a single unitary head casting having a transverse web in which the lower ends of all of the tubes are mounted, a series of condensate basins formed in the upper portion of the head casting, independent heads connected to the upper portion of each bank of tubes, an enclosing shell surrounding the tubes and connected to the head casting, baffle plates secured to the shell and extending between the banks of tubes, and means for directing the flow of a cooling medium through the interior of the tubes.

9. Refining apparatus comprising a series of banks of tubes, a single unitary head in which one end of all of the tubes are mounted, independent heads connected to the opposite end of each bank of tubes, an enclosing shell surrounding the tubes and connected with the unitary head, baffle plates extending from between the independent heads partially throughout the length of the tubes and from the opposite ends of the tubes partially toward the heads to provide a tortuous vapor passage about the exterior of the tubes, and means for directing the flow of cooling medium through the interior of the tubes.

10. Apparatus for fractionating oil vapor comprising a series of vertical condenser tubes, means for passing vapor to be condensed through the space surrounding the exterior of the tubes and a detachable closure having partitions thereon to form a series of passages communicating with the lower open ends of the tubes for directing the flow of cooling medium therethrough, the closure being adapted to be replaced in a manner to vary the path of flow of cooling medium through successive tubes and graduate the condensate as desired.

11. Refining apparatus comprising a series of banks of tubes, a unitary head connecting the tubes at one end and having cooling fluid directing ribs formed thereon, a plurality of independent heads connecting the tubes at the opposite ends, and detachable closure means cooperating with the directing ribs when in place to form liquid passages communicating with the interior of the tubes and to permit selective control of the liquid passages to vary the path of flow through the interior of the tubes.

12. Apparatus for fractionating oil vapor comprising a plurality of condenser tubes, a head to which the tubes are secured at one end, means for passing oil vapor about the exterior of the tubes, a plurality of partitions extending from the head opposite the vapor space, and a detachable closure having partitions cooperating with a part only of the first-mentioned partitions to form passages for directing cooling medium in a predetermined path through the interior of the tubes, the closure being adapted to be replaced by another to vary the passages and the flow of cooling medium, and thus control the temperatures of fractionation and graduate the condensate as desired.

13. Refining apparatus comprising a tube supporting head having a transverse partition, a plurality of open-ended tubes extending through the partition and connected thereto, a plurality of condensate basins formed upon the upper side of the partition, a plurality of liquid passageways formed upon the under side of the partition communicating with the open ends of the tubes, and a detachable cover plate connected to the supporting head and adapted to close the passages.

14. Refining apparatus comprising a unitary head casting having a transverse partition formed integral therewith, a series of open-ended tubes passing through and connected to the partition at one end, a head connected to the opposite end of the tubes, a collecting basin surrounding the tubes above the transverse partition, means upon the partition for maintaining liquid condensate out of contact with the tubes, and a series of passages formed in the tube support upon the opposite side of the partition and communicating with the open ends of the tubes.

15. Refining apparatus comprising a unitary tube support having a transverse partition formed therein, a series of open-ended tubes passing through the partition at their lower ends, a series of separate collecting basins formed in the tube support above the partition, openings communicating with the basins to permit the withdrawal of liquid therefrom, an enclosing shell surrounding the tubes above the support, means for forming a series of vapor passes about the tubes to keep the vapor in contact with the exterior of the tubes, and means for directing the circulation of a cooling agent through the interior of the tubes.

16. Refining apparatus comprising a plurality of vertical tubes, a transverse head in which the lower ends of the tubes are mounted, a shell enclosing the tubes and connected with the head, a chamber communicating with the lower ends of the tubes below the head, a series of condensate basins formed in the upper portion of the head and surrounding the lower ends of the tubes, and liquid outlets communicating with the separate condensate basins to permit complete withdrawal of condensate therefrom.

17. Apparatus for fractionating oil vapor, comprising a series of banks of condenser tubes, means for passing oil vapor through the space surrounding the exterior of the tubes, means for selectively controlling the cooling effect of the tubes, and means for withdrawing condensate from the lowermost portion of the space surrounding the tubes.

18. Refining apparatus comprising a series of banks of tubes, a unitary tube support connecting the tubes at one end, a series of cooling fluid directing ribs at the under side of the support, a plurality of independent floating heads connecting the tubes at the opposite ends, a shell enclosing the tubes, baffle plates connected to the shell and extending lengthwise of the tubes from between the floating heads to permit sliding movement of the floating heads relative thereto, and a detachable closure cooperating with the directing ribs to provide liquid passages communicating with the interior of the tube.

19. Refining apparatus comprising a series of banks of tubes, means for directing a flow of vapor through a series of passes about the exterior of the tubes, means for separately collecting and withdrawing a series of condensates from about the lower ends of the tubes, and means for directing a cooling medium through the interior of each bank of tubes in a manner to govern the progressive cooling of the vapor and control the character of the condensate in a predetermined manner.

20. Refining apparatus comprising a plurality of tubes, a tube support in which the lower ends of all of the tubes are mounted, a condensate basin formed above the tube support and surrounding the lower ends of the tubes, a liquid outlet communicating with the basin and adapted to remove condensate therefrom, an opening communicating with the basin and designed to provide for the flushing out of the basin in conjunction with the outlet, and means below the tube support for directing the flow of cooling medium through the interior of the tubes.

21. Refining apparatus comprising a series of banks of vertical condenser tubes, a transverse tube support in which the lower ends of the tubes are mounted, a series of condensate basins surrounding the lower ends of the tubes above the support, independent heads connected to the upper portion of each bank of tubes, an enclosing shell surrounding the tubes and connected with the support, baffle plates connected to the shell and extending between the banks of tubes, and means below the tube support for directing the flow of cooling medium through the interior of the tubes.

22. Refining apparatus comprising a tube support forming a transverse partition, a series of open-ended tubes passing through and connected to the partition, a head connected to the opposite end of the tubes, a collecting basin, surrounding the lower ends of the tubes above the partition, means upon the partition for removing liquid condensate from contact with the lower ends of the tubes, and a series of passages formed at the under side of the partition and communicating with the open ends of the tubes for directing the flow of cooling medium therethrough.

23. Refining apparatus comprising a tube support forming a transverse partition, a series of open-ended tubes passing through and connected to the support, a head connected to the opposite ends of the tubes, means for withdrawing liquid condensate from about the lower ends of the tubes above the partition, means for maintaining stagnant condensate from contact with the lower ends of the tubes, and means at the under side of the partition for directing the flow of cooling medium through the interior of the tubes.

24. Refining apparatus comprising a series of banks of condenser tubes, a member for supporting the tubes at one end, a plurality of independent floating heads connected to the tubes at the opposite ends, a shell enclosing the tubes, and a partition member extending longitudinally of the tubes and between adjacent floating heads to direct the vapor about the exterior of the tubes.

CHARLES H. LEACH.